3,357,487
METHOD OF OIL RECOVERY WITH A HOT DRIVING FLUID

Ralph E. Gilchrist, Emery M. Craighead, and Donald O. Hitzman, Bartlesville, Okla., assignors to Phillips Petroleum Company, a corporation of Delaware
No Drawing. Filed Aug. 26, 1965, Ser. No. 482,939
13 Claims. (Cl. 166—11)

ABSTRACT OF THE DISCLOSURE

Recovery of oil from an oil stratum is improved by injecting a slug of an oil or water solution of surfactant stable at temperatures up to at least 650° F. into the stratum, following with a driving fluid free of surfactant, and producing displaced oil thru a well penetrating the stratum, injection and production being effected thru a single well by so-called "huff and puff" or thru spaced-apart wells.

---

This application is a continuation-in-part of application Ser. No. 436,351, filed Mar. 1, 1965, now abandoned.

This invention relates to a novel process for recovering oil from an oil-bearing stratum utilizing hot driving fluid.

Oil-bearing strata, particularly those containing viscous oils and tars, retain much of the oil after being produced by ordinary production methods. Water flooding with and without the use of steam has been practiced but such methods leave substantial quantities of oil and/or tar in the produced stratum.

This invention is concerned with a novel and unique method for more completely producing the oil and/or tars from a stratum than has heretofore been possible with steam and water drive techniques.

Accordingly, it is an object of the invention to provide a novel and improved process for producing oil and/or tar from a stratum containing same using aqueous fluid drive. Another object is to provide a process which more completely recovers the oil and/or tar from an oil or tar-containing stratum. A further object of the invention is to provide an oil recovery process which more efficiently utilizes hot aqueous driving fluid, particularly in the range of 500° to 650° F. and higher. Other objects of the invention will become apparent to one skilled in the art upon consideration of the accompanying disclosure.

A broad aspect of the invention comprises injecting a slug of a surfactant (surface active agent) stable at temperatures up to at least 650° F. in a concentration in the range of 0.01 to 5 weight percent of the slug in an amount in the range of 0.01 to 10 percent of the hydrocarbon pore volume, driving the injected slug thru the stratum by injecting the hot aqueous driving fluid substantially free of the surfactant behind the slug so as to build up stratum pressure, shutting in the well for a substantial soaking period, and thereafter opening the well to flow so as to allow stratum pressure to drive injected fluids and oil back into the well. The produced oil is then recovered in conventional manner, as by fluid pressure or pumping. In another embodiment of the invention, the same technique is utilized to inject the slug and the hot aqueous driving fluid and the injected fluids are driven thru the stratum to at least one other well therein so as to produce oil in said other well. Thus, the technique is applicable to a single well in a stratum or to any desirable well pattern such as a conventional spot pattern or rows of in-line wells.

The preferred driving fluid is steam used as a temperature in the range of 500–650° F. and even higher temperatures may be utilized with surface active agents which withstand higher temperatures than 650° F. Water heated approximately to the boiling point under pressure is also an excellent driving agent behind the slug containing the surfactant.

Another technique useful in the process of the invention comprises injecting a second aqueous slug containing the surfactant in the specified concentration behind the hot driving fluid as a scavenging agent and driving this scavenging agent thru the stratum toward the producing well(s) with a driving fluid which may also be hot or at ambient temperature.

It has been discovered that a number of commercially available surfactants withstand temperatures as high as 650° F. and higher without the surface tension thereof being appreciably altered. In fact, in some cases, the surface tension is actually improved after heating to these high temperatures. The surfactants are organic materials containing portions hydrophobic and hydrophilic to each other and include the three recognized classes of surfactants, viz., anionic, cationic, and nonionic. The requirements for an adequate surfactant for use in the invention include complete miscibility in water and/or oil and stability at temperatures at least as high as 650° F.

A number of water miscible surfactants coming within the scope of the invention were tested to determine the surface tension thereof after heating to 650° F. The tests were made utilizing a 0.1 weight percent aqueous solution of the agent. The surface tension of this solution in dynes/cm. at 25° C. was chosen as the measurement standard for each sample. The surface tension of each 0.1 weight percent sample solution was determined and compared with the manufacturers reported data. The sample was then charged to a pressure cylinder and the temperature raised from room temperature to 650° F., held for two hours at this temperature, and then lowered to room temperature. The cylinder was kept sealed during the heating to prevent concentration by boil-off. The results of the tests are tabulated below:

TABLE

| Chemical Name | Trade Name | Surf. Ten.[1] Mfg. Data | Surf. Ten.[1] Before Heat | Surf. Ten.[1] After Heat |
| --- | --- | --- | --- | --- |
| Polyoxyethylene sorbitan monolaurate | Tween 20 | 37.0 | 37.5 | 35.1 |
| Polyoxyethylene sorbitan monopalmitate | Tween 40 | 41.0 | 42.9 | 49.3 |
| Polyoxyethylene sorbitan monostearate | Tween 60 | 44.0 | 37.5 | 52.1 |
| Polyoxyethylene sorbitan monooleate | Tween 80 | 42.0 | 39.7 | 38.8 |
| Polyoxyethylene alkylarylether | Renex 650 | | 41.5 | 35.4 |
| Polyoxyethylene esters of mixed fatty and resin acids | Renex 22 | | 38.4 | 44.5 |
| Polyoxyethlene etheralcohol complexed with urea | Renex 35 | | 29.0 | 27.2 |
| Polyoxyethylene fatty glyceride | G1295 | | 46.1 | 40.5 |
| Polyoxyethylene oxypropylene stearate | G2162 | | 43.5 | 48.0 |
| Polyoxyethylene-25 propylene glycol monostearate | G2160 | | 39.2 | 46.8 |

[1] Surface tension in dynes per cm. at 25° C.

It is evident that in all instances the surface tension of the surfactant was not materially unfavorably altered by the heat treatment and, in some cases, was actually improved thereby. These test data demonstrate that certain selected commercial surfactants can be used successfully with steam at temperatures up to at least 650° F. in secondary recovery projects.

A few oil-soluble surfactants operable in the invention are listed below:

| Trade Name | Chemical Name | Form | Conc., Percent | Type |
|---|---|---|---|---|
| Dowfax 9N4 | Nonylphenol-4 mole ethylene oxide adduct | Liquid | 100 | Nonionic. |
| Igepal DM-430 | Alkylphenoxypoly(ethyleneoxy)ethanol | do | 100 | Do. |
| Neutronyx 626 | Alkylphenolpolyglycol ether containing 6 moles ethylene oxide | do | 100 | Do. |

Some surfactants which are soluble in both water and oil are listed below:

| Trade Name | Chemical Name | Form | Conc., Percent | Type |
|---|---|---|---|---|
| Fatchemco | Fatty imidazoline 1-hydroxyethyl, 2-hepta-decenyl imidazoline | Liquid | 100 | Cationic. |
| Deriphat 170C | N-lauryl Myristyl beta amino propionic acid | do | 50 | Amphoteric. |
| Armeen 2HT | Secondary fatty amines (di-N-alkyl amine) | Solid | 100 | Cationic. |
| Deriphat 151 | Sodium salt of N-coco beta amino propionate | do | 100 | Amphoteric. |
| Armeen SZ | An alkali metal salt of N-coco amino buturic acid | Liquid | 40 | Do. |
| Triton QS-15 | Sodium salt of amphoteric surfactant | do | 100 | Do. |

Other surfactants of the various classes may be found in Detergents and Emulsifiers (1963 Annual), John W. McCutcheon, Inc., Morristown, New Jersey.

Such oil solvents as propane, LPG, gasoline, kerosene, jet fuel, Stoddard solvent, benzene, xylene, toluene, fuel oil, gas oil, diesel oil, and even crude oil compatible with the crude to be produced may be used as the carrier for the oil soluble surfactants.

The technique of the invention is particularly applicable to the so-called "huff and puff" process wherein steam is injected into a stratum to be produced thru a single drill hole or well for a period of about 10 to 30 days, thereby building up substantial steam pressure in the stratum, and after a soaking period of about 2 to 10 days, the well is put on production until the production of oil is minimal. The injection, soaking, and production steps are then repeated as many times as is profitable with the affected area around the well increasing substantially on each repetition of the sequence of steps. The invention improves this "huff and puff" technique by injecting a slug of the surfactant into the stratum prior to the steam injection by increasing the sweep efficiency of the injected fluid and by more effectively displacing the oil from the sand grains in the stratum.

The surfactant is injected into the formation as an aqueous or oil slug, followed by the injection of steam or hot water. Alternatively, the steam and surfactant may be introduced substantially simultaneously by introducing the aqueous slug and steam into the well simultaneously thru separate or common tubing. The surfactant may also be introduced directly into the steam in the form of an aqueous or oil mist or spray. When injecting the slug containing surfactant ahead of the steam, it is advantageous to heat the solvent into which the surfactant is introduced, to substantially the boiling temperature of water to minimize condensation of steam following the slug. It is also feasible to periodically inject the solution of surfactant intermittently into the injected steam and/or hot water at the well head or downhole. The surfactant in combination with the solution carrier permits a large amount of surfactant to be spotted in a narrow band and yet transfer it thru the stratum easily by the push of the steam or hot water to recover extra oil while retaining its identity.

In practicing the invention, the surfactant improves the injectivity of the well, thereby increasing the rate at which steam can be injected into the stratum as well as producing larger quantities of oil in a shorter period of time than is accomplished without the aid of the slug containing the surfactant.

Certain modifications of the invention will become apparent to those skilled in the art and the illustrative details disclosed are not to be construed as imposing unnecessary limitations on the invention.

We claim:

1. A process for producing oil from an oil-bearing stratum penetrated by a well which comprises the steps of:
   (1) injecting thru said well into the surrounding stratum a slug of a surfactant stable at temperatures up to at least 650° F. dissolved in an oil solvent, the concentration of said surfactant being in the range of 0.01 to 5 weight percent and said slug being in the range of 0.1 to 10 percent of the oil pore volume;
   (2) injecting into said stratum thru said well hot aqueous driving fluid substantially free of surfactant so as to move said slug a substantial distance into said stratum from said well and increase the pressure in the stratum surrounding said well;
   (3) following step (2), shutting in said well for a substantial soaking period;
   (4) following step (3), opening said well to flow so as to allow stratum pressure to drive injected fluids and oil into said well;
   (5) producing oil from said well; and
   (6) repeating steps (1) thru (5) in order.

2. The process of claim 1 wherein the driving fluid of step (2) is steam heated to a temperature in the range of 500 to 650° F.

3. The process of claim 1 wherein the driving fluid of step (2) is hot water.

4. The process of claim 1 wherein said surfactant is water-soluble and said solvent is water.

5. The process of claim 1 wherein said surfactant is dissolved in an oil compatible with and no heavier than stratum oil and a slug of steam is injected immediately in advance of the slug of surfactant in step (1).

6. A process for producing oil from an oil-bearing stratum penetrated by a well which comprises the steps of:
   (1) injecting thru said well into the surrounding stratum a slug of a surfactant stable at temperatures up to at least 650° F. dissolved in an oil solvent, the concentration of said surfactant being in the range of 0.01 to 5 weight percent and said slug being in the range of 0.1 to 10 percent of the oil pore volume;
   (2) injecting into said stratum thru said well hot aqueous driving fluid substantially free of surfactant so as to move said slug a substantial distance into said stratum from said well;
   (3) thereafter moving said slug thru said stratum toward a production well so as to displace oil thereinto; and (4) recovering the produced oil.

7. The process of claim 6 wherein the injection of aqueous driving fluid in step (2) is continued so as to drive oil into at least one offset production well.

8. The process of claim 7 wherein steam at a temperature in the range of 500 to 650° F. is used as the driving fluid of step (2).

9. The process of claim 7 wherein hot water at a temperature in the range of 500 to 650° F. is used as the driving fluid of step (2).

10. The process of claim 7 wherein first said well is the center well within a ring of wells and the oil is produced in said ring wells.

11. The process of claim 7 including the steps of:
(5) injecting a second slug of the composition of step (1) following step (2);
(6) driving said second slug thru said stratum toward said other well as scavenging fluid to produce additional oil; and
(7) recovering said additional oil.

12. The process of claim 11 wherein water is used to drive said second slug thru said stratum to said other well.

13. The process of claim 11 wherein steam is used to drive said second slug thru said stratum to said other well.

References Cited

UNITED STATES PATENTS

| | | | |
|---|---|---|---|
| 2,288,857 | 7/1942 | Subkow | 166—40 X |
| 2,813,583 | 11/1957 | Marx et al. | 166—40 X |
| 3,115,929 | 12/1963 | Emery | 166—11 |
| 3,204,694 | 9/1965 | Johnson et al. | 166—11 |
| 3,259,186 | 7/1966 | Dietz | 166—11 |
| 3,292,702 | 12/1966 | Boberg | 166—40 |

FOREIGN PATENTS 511,768   8/1939   Great Britain.

CHARLES E. O'CONNELL, *Primary Examiner.*

STEPHEN J. NOVOSAD, *Examiner.*